United States Patent [19]

Kamiyama et al.

[11] Patent Number: 4,861,238

[45] Date of Patent: Aug. 29, 1989

[54] PULSATION PREVENTIVE MEMBER FOR PUMP

[75] Inventors: Akira Kamiyama; Nobuo Yamagisawa; Nobuyuki Oshima, all of Kiryu, Japan

[73] Assignee: Mitsuba Electric Manufacturing Co., Ltd., Gunma, Japan

[21] Appl. No.: 59,535

[22] Filed: Jun. 8, 1987

[30] Foreign Application Priority Data

| | | | |
|---|---|---|---|
| Jun. 7, 1986 | [JP] | Japan | 61-132172 |
| Aug. 4, 1986 | [JP] | Japan | 61-183038 |
| May 27, 1987 | [JP] | Japan | 62-131006 |

[51] Int. Cl.[4] .......... F04B 35/04; F16L 11/00

[52] U.S. Cl. .......... 417/363; 417/313; 138/123; 138/125

[58] Field of Search .......... 417/363; 138/26, 28, 138/125, 119, 123; 60/469

[56] References Cited

U.S. PATENT DOCUMENTS

| | | | |
|---|---|---|---|
| 2,956,586 | 10/1960 | Ziegler | 60/469 |
| 3,134,611 | 5/1964 | Iversen | 60/469 |
| 3,294,025 | 12/1966 | Niemeyer et al. . | |
| 3,362,588 | 1/1968 | Jeep, Jr. et al. . | |
| 3,418,991 | 12/1968 | Shultz et al. . | |
| 3,658,444 | 4/1972 | Rhodes et al. . | |
| 3,905,398 | 9/1975 | Johansen | 138/140 |
| 4,007,070 | 2/1977 | Busdiecker | 138/124 |
| 4,228,324 | 10/1980 | Evans | 138/119 |
| 4,259,991 | 4/1981 | Kutnyak | 138/125 |
| 4,264,287 | 4/1981 | Ishida et al. . | |
| 4,273,160 | 6/1981 | Lowles | 138/127 |
| 4,285,534 | 8/1981 | Katayama et al. . | |
| 4,303,457 | 12/1981 | Johansen | 138/125 |
| 4,352,641 | 10/1982 | Tuckey . | |
| 4,366,746 | 1/1983 | Rosecrans | 138/125 |
| 4,370,102 | 1/1983 | Sasaki et al. . | |
| 4,373,872 | 2/1983 | Kemmner et al. . | |
| 4,449,742 | 5/1984 | Toerner | 138/124 |
| 4,467,837 | 8/1984 | Baker | 138/119 |
| 4,521,164 | 6/1985 | Tuckey . | |
| 4,540,354 | 9/1985 | Tuckey | 418/15 |
| 4,553,568 | 11/1985 | Piccoli | 138/125 |
| 4,569,637 | 2/1986 | Tuckey | 417/363 |
| 4,596,519 | 6/1986 | Tuckey | 418/15 |
| 4,642,035 | 2/1987 | Nyquist | 138/26 |

FOREIGN PATENT DOCUMENTS 2832299 1/1980 Fed. Rep. of Germany .

*Primary Examiner*—William L. Freeh
*Attorney, Agent, or Firm*—Oliff & Berridge

[57] ABSTRACT

A pulsation preventive member for use with a pump constructed in the form of a hose disposed in a pump fluid passage. The hose is located in a fuel tank in such a manner that one end of the hose is connected with the pump and the other end of the hose is connected with a injector or the like. The hose is constructed so as to substantially inhibit pulsation by elastically deforming. The hose may have a substantially circular cross-sectional shape and a mesh-shaped thread layer incorporated therein. The mesh angle of the thread layer is preferably less than 50 degrees. Alternatively, the hose may have non-circular cross-sectional shape such as rectangular or elliptical cross-sectional shape. Further, the hose may be constructed so as to have a double-walled structure comprising an inner layer and an outer layer in the form of a hose with a plurality of connecting members interposed therebetween.

10 Claims, 5 Drawing Sheets

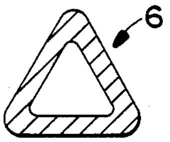
Fig. 7A
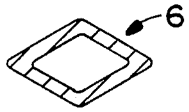
Fig. 7B
Fig. 8
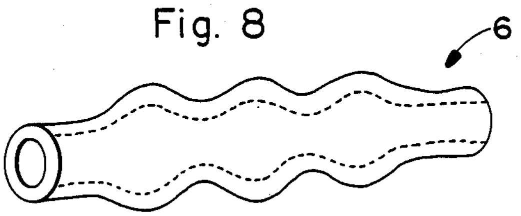
Fig. 9A
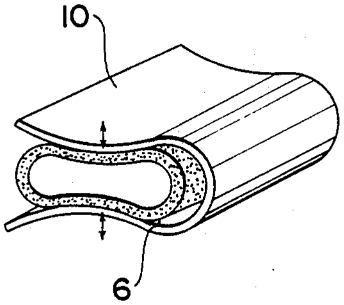
Fig. 9B
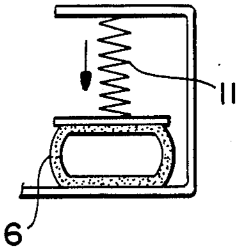

PULSATION PREVENTIVE MEMBER FOR PUMP

BACKGROUND OF THE INVENTION

The present invention relates to a pulsation preventive member useable for a pump such as fuel supply pump or the like in a motorcar.

Generally, various types of pumps such as the vane type, the trochoid type, the turbine type or the like are used for the aforesaid pump. Among these pumps, and particularly in the case of displacement types pumps, pulsation is inavoidably generated as the pump is driven, causing the hose, piping, fittings, or the like in the pump fluid passage to be vibrated and possibly resonate. Thus pulsation is a significant factor in the generation of noise. Further, when the pump is driven, fluid tends to be supplied to a fluid supply side while it is kept in the pulsative state thereby adversly effecting the system.

In order to overcome the aforementioned problems a pulsation absorbing device such as damper or the like is often disposed in the pump or the fluid passage to absorb pulsation. However, known pulsation absorbing devices are complicated in structure, large in size and expensive in cost. Accordingly, the development of a pulsation preventive means to replace the conventional pulsation absorbed device would be desirable.

SUMMARY OF THE INVENTION

The present invention has been made with the foregoing background in mind and its object resides in providing a pulsation preventivemember for use in a pump which is entirely free of the aforementioned drawbacks.

To accomplish the above object, the present invention provides a pulsation preventive member for use in a pump which is characterized in that a pump field passage is provided with a hose which is elastically deformed under the influence of pulsation of the pump. In other words, the hose of the present invention elastically deforms to absorb pulsation. According to the present invention absorption of pulsation can be reliably achieved with the aid of the hose of the present invention which is disposed in the fluid passage of a pump. Accordingly, there is no need for a conventional pulsation absorbing device.

A first embodiment of the hose of the present invention has a circular cross-sectional shape and a mesh-shaped thread layer is incorporated in the hose. The mesh angle of the thread layer is preferably determined less than 50 degrees. Alternatively, the hose may have a rectangular or elliptical crosssectional shape. Further, the hose may be constructed in a double-walled structure comprising an inner layer and an outer layer with a plurality of connection members interposed therebetween.

Other objects, features and advantages of the present invention will become readily apparent from reading of the following description which has been prepared in conjunction with the accompanying drawings.

BRIEF DESCRIPTION OF THE DRAWINGS

The accompanying drawings will be briefly described below.

FIG. 7(A) and 7(B) are cross-sectional views of hoses in accordance with the fourth embodiment of the invention respectively.

FIG. 8 is a perspective view of a hose in accordance with the fifth embodiment of the invention.

FIGS. 9(A) and 9(B) are a perspective view and a vertical sectional view of a hose in accordance with the sixth embodiment of the invention.

DESCRIPTION OF THE PREFERRED EMBODIMENTS

Now, the present invention will be described in greater detail hereunder with reference to the accompanying drawings which illustrate preferred embodiments thereof.

First, description will be made below as to a pulsation preventive member in accordance with a first embodiment of the invention.

Figure 1:
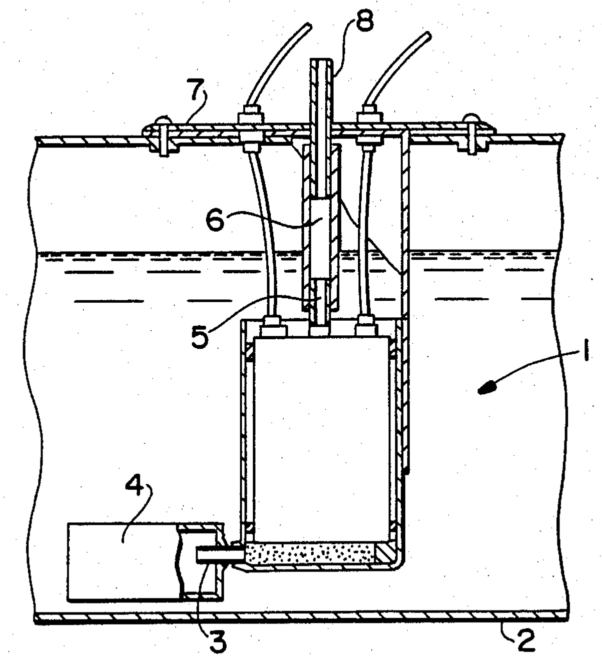
FIG. 1 is a vertical sectional view of a fuel tank in which a hose of the invention is located.
Figure 2A:
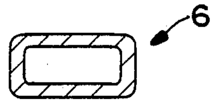
FIGS. 2(A) and 2(B) are cross-sectional view of a hose in accordance with the first embodiment of the invention.
Figure 2B:
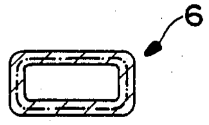
Figure 3A:
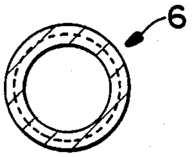
FIGS. 3(A) and 3(B) are cross-sectional views of a hose in accordance with the second and third embodiments of the invention respectively.
Figure 3B:
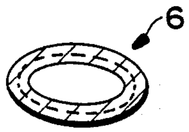
Figure 4:
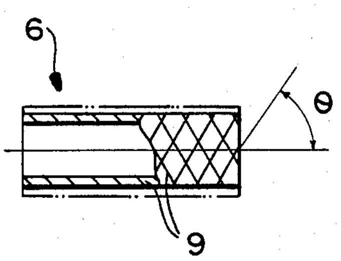
FIG. 4 is a partially sectioned view of a hose, particularly illustrating the mesh angle $\theta$ of the thread layer on a hose of the invention.

In FIG. 1 reference numeral 1 designates a fuel supply pump located in a fuel tank 2 of a motorcar. The pump 1 is designed and constructed, for instance, in the form of a trochoid type displacement pump and its inlet port 3 is connected to a filter 4 so that the filtered fuel is introduced into the interior of the pump 1. A delivery port 5 of the pump 1 is connected to the one end of a hose 6 to which the present invention is applied in such a manner as described later. Further, the other end of the hose 6 is firmly connected to piping 8 made of metallic material which extends upwardly through a cover plate 7 and is secured to the wall surface of the fuel tank 2. As the pump 1 is driven, fuel is supplied to an injector (not shown) via the hose 6 and the piping 8.

Generally, the hose 6 is made of flexible oil resistant resin such as acrylonitrile-butadiene rubber (NBR) fluororesin or the like and it has a substantially rectangular sectional shape. When the hose 6 is subjected to pressure generated by the pump 1, it is elastically deformed to increase and decrease in cross-sectional area between the present (expanded) sectional shape and the initial sectional shape.

In fact, a comparison was made among the hoses of the invention and conventional hoses. Specifically, one of the hoses of the invention (first hose) is such that it has a rectangular sectional shape and the other one (second hose) is such that is has a rectangular sectional shape with a reinforcing thread layer 9 incorporated therein. The thread layer 9 consists of a plurality of knitted threads arranged in a mesh shaped structure. One of the conventional hoses used in the comparison is a hose having a circular sectional shape and the other conventional hose is a piping made of metallic material. The pulsative state was represented by the difference in pressure between the inlet port and outlet port. The results of the measurement conducted are shown in Table 1. It should be noted that during each of the comparative measurements, delivery pressure of the pump 1 was maintained at a level of 2.05 $Kg/cm^2$ and the pulsative state was measured at both the inlet port and outlet port using a synchroscope. The total length of the hose 6 was 12 cm and the ends of the hose were fitted on the delivery port 5 and the piping 8 by about 2 cm. Further, the thread layer 9 in the second hose was so determined that an inner diameter was 7.5 mm, and outer diameter was 13.5 mm, the mesh-shpaed structure comprised 12 rightward wound threads and 12 leftward wound threads. The knitting angle of the mesh-shaped structure (i.e., the smallest included angle between a rightward wound thread or a leftward wound thread and the longitudinal axis of the hose amounted to 55 degrees on the assumption that the hose was converted to a hose having a circular sectional shape.

TABLE 1

| | differential pressure at the inlet port ($Kg/cm^2$) | differential pressure at the outlet port ($Kg/cm^2$) | pulsation reduction rate (%) |
|---|---|---|---|
| piping made made of metallic material | 0.85 | 0.58 | 31.8 |
| conventional hose | 0.85 | 0.58 | 62.3 |
| first hose | 0.85 | 0.02 | 97.6 |
| second hose | 0.85 | 0.07 | 91.8 |

It is obvious from the above-noted results that each of the hoses of the invention (first hose and second hose) has a very high pulsation reduction rate in comparison with the conventional hoses. Further, it is found that the first hose has a reduction rate substantially equal to that of a conventional large-sized pulsation absorbing device and the second hose has a reduction rate substantially equal to that of a conventional small-sized pulsation absorbing device. Thus, it will be obvious from the above-noted results that each of the hoses of the invention is highly effective in preventing pulsation. Further, as a result of the comparison, it is clear that the hose of the invention can achieve substantially the same reduction of pulsation as in the case where a conventional pulsation absorbing device is used. It can be supposed that such desirable results are attributable to elastic deformation from the rectangular cross-sectional shape in the relaxed state to a substantially circular cross-section under the effect of pulsation transmitted from the pump 1 and the resultant increase and decrease in cross-sectional area of the hose. It is well known that a conventional hose having a circular cross-sectional shape is not significantly deformed under the influence of pulsation and thereby it has a lower reduction rate. Moreover, since a hose having a thread layer 9 has a very high pressure resistance, such hose are particularly practicable.

As will be apparent from the description of this embodiment, the hose 6 of the present invention is effective at absorbing pulsation generated by operation of the pump despite its very simple structure because the hose is elastically deformed under the influence of differential pressure caused by pulsation of the pump 1. Accordingly, the hose 6 functions as a pump passage without any substantial pulsation even though it is simple in structure and does not include a separate pulsation absorbing device. Thus, in accordance with the present invention a pump passage can be designed simply and light in weight at a remarkably reduced cost.

In this embodiment the pump 1 is designed and constructed as an intake type which is located in the fuel tank 2 and the hose 6 is disposed in an area defined between the outlet port 5 of the pump 1 and the piping 8 such that one end thereof is connected to the outlet port 5 of the pump 1 and the other end is connected to the piping 8. As a result of this arrangement of the hose 6, any pulsation caused by operation of the pump does not come out of the hose 6 but it is absorbed in the hose 6 in the fuel tank 2 and thereby fuel flows smoothly through the piping 8 with pulsation reduced to a minimized level. Thus, the occurrence of pulsation can be effectively inhibited and influence of pulsation is restricted within the interior of the fuel tank 2 on the assumption that pulsation occurs and that hose 6 is elastically deformed. Accordingly, adverse influence is not transmitted to the engine.

Next, description will be made below as to second and third embodiments of the present invention.

Figure 5:
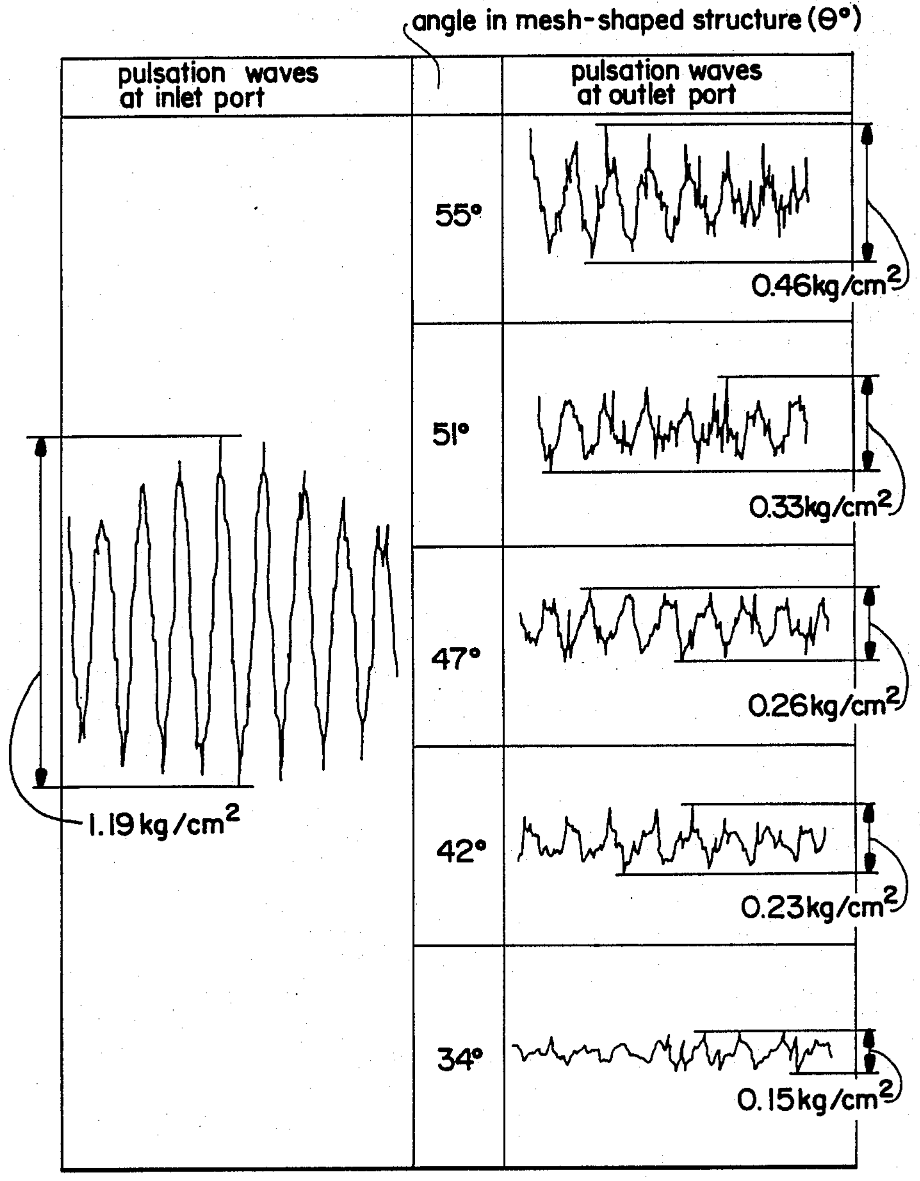
FIG. 5 is a graph illustrating the relationship between pulsation reduction angle and rupture pressure in the case where the mesh angle of the thread layer on the hose in accordance with the second embodiment varies.

As described above with respect to the first embodiment, it is found that hoses having a thread layer 9 in the form of mesh-shaped structure incorporated within the hose are considerably effective for inhibiting pulsation. In order to achieve even greater inhibition of pulsation a number of experiments were conducted to determine how pulsation reduction rate varies when the mesh angle $\theta$ in the mesh-shaped structure varies. The mesh angle $\theta$ is defined as the smaller of the two included angles formed between a rightwardly wound thread or a leftwardly wound thread and the longitudinal axis of the hose. In fact, examination was carried out on the hoses 6 having circular cross-sectional shape as well as hoses having an elliptical cross-sectional shape. The hoses having an elliptical cross-sectional shape were obtained by flattening the hoses having a circular cross-sectional shape. The hoses having a circular cross-sectional shape had an inner diameter of 7.5 mm and an outer diameter of 13.5 mm and reinforcement was constituted by a meshshaped structure comprising 12 rightwardly wound threads and 12 leftwardly wound threads. Measurements were carried out under the same conditions as those in the first embodiment. The results of the experiments are as shown in Table 2. FIG. 5 is a graph which illustrates the wave form of pulsation at both the inlet port and outlet port with respect to the hoses having a circular cross-sectional shape.

TABLE 2

| cross-sectional shape | angle in mesh-shaped structure θ(degrees) | differential pressure at inlet port ($Kg/cm^2$) | differential pressure at outlet port ($kg/cm^2$) | rate of reduction (%) |
|---|---|---|---|---|
| circular shape | 55 | 1.19 | 0.46 | 61.3 |
| circular shape | 51 | 1.19 | 0.33 | 72.3 |
| circular shape | 47 | 1.19 | 0.26 | 78.2 |
| circular shape | 42 | 1.19 | 0.23 | 80.7 |
| circular shape | 34 | 1.19 | 0.15 | 87.4 |
| elliptical shape | 55 | 1.19 | 0.40 | 66.4 |
| elliptical shape | 47 | 1.19 | 0.19 | 84.0 |
| elliptical shape | 34 | 1.19 | 0.10 | 91.6 |

Figure 6:
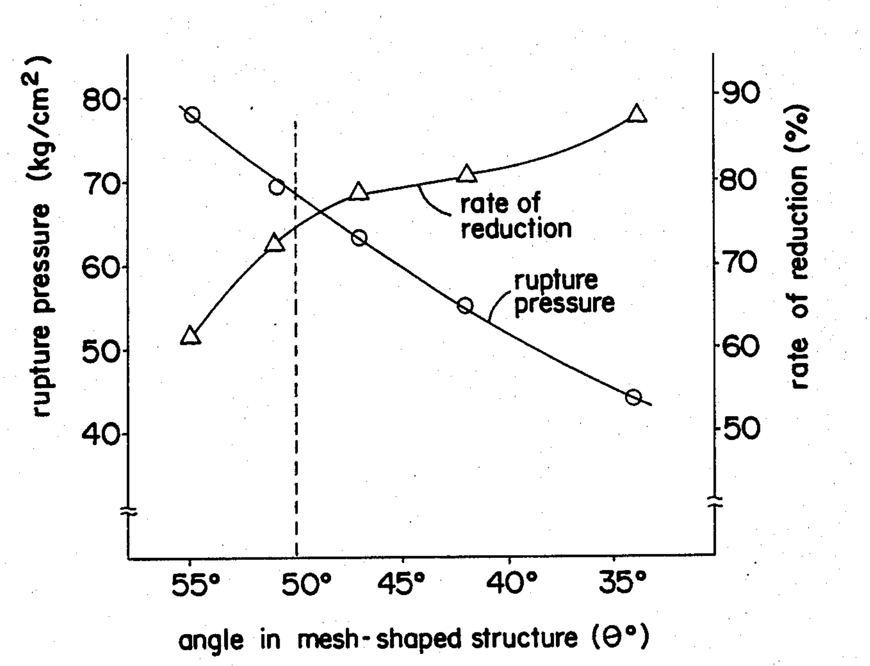
FIG. 6 is a graph illustrating results of measurements in the case where the mesh angle $\theta$ of the thread layer on the hose in accordance with the second embodiment varies.

It is apparent from these results that hoses having an elliptical cross-sectional shape have a higher pulsation reduction rate (by approximately 5%) than hoses having a circular cross-sectional shape at any angle in the mesh-shaped structure. This reveals that the hose of the invention is very effective in reducing pulsation. Surprisingly, it is observed that, at least in the range of 34–55 degrees, the smaller the angle of the thread layer 9, the larger the pulsation reduction rate. Further, FIG. 6 is a graph which illustrates the variation in rupture pressure and pulsation reduction rate as the angle $\theta$ in the mesh-shaped structure varies.

It is apparent from reviewing the graph that in order to achieve a pulsation reduction rate of at least 76% which is the minimum realistically required value, it is required that the knitting or mesh angle $\theta$ be less than about 50 degrees. This makes it possible to select a hose having excellent pulsation preventive effect within the allowable scope of rupture pressure even when the hose has a circular cross-sectional shape. If a hose requires a higher pulsation preventive effect, it is recommendable that a hose having a non-circular cross-sectional shape such as an elliptical cross-sectional shape or the like be used. In hoses having an elliptical cross-sectional shape, rupture pressure is practically identical to that of a hose having a circular cross-sectional shape. When the ends of the hose are fitted to the outlet port 5 or piping 8, the end part of the hose becomes expanded to assume a substantially circular cross-sectional shape and thereby tightening operation with the use of a tightening band is uniformly performed in substantially the same manner as a hose having a circular cross-sectional shape, unlike the case where a hose has square corners. Accordingly, this embodiment is preferably employed.

Next, description will be made below as to fourth to sixth embodiments.

As another hose which has non-circular cross-sectional shape and is elastically deformed under the influence of pulsation, a hose of having a cross-sectional shape which is triangular, angular, rhombic or the like is proposed in accordance with the fourth embodiment shown in FIG. 7. It should be emphasized that the hose in accordance with this embodiment has substantially the same pulsation absorbing effect as in the case of the foregoing embodiments. In the case where the hose has angular corners it is recommendable that the side portion is made softer than the corner portions so that elasticity is imparted to the hose so that the hose is elastically deformed under the influence of pulsation. Further, it is also recommendable that a hose 6 has ruggedness (i.e., periodic variations in inner and outer cross-section) in accordance with the fifth embodiment, as shown in FIG. 8. Also in this embodiment, the hose is elastically deformed under the effect of pulsation. It is observed that the hose in accordance with this embodiment has an excellent pulsation absorbing effect.

Further, as means adapted to be elastically deformed under the influence of pulsation it is not necessary that the hose has such cross-sectional shape that it is liable to be subjected to elastic deformation. Alternatively, a hose having a conventional circular cross-sectional shape may be clamped by means of an U-shaped resilient plate 10 in accordance with sixth embodiment, as shown in FIG. 9(A). Alternatively, a spring 11 may be disposed between the hose 6 and the one arm plate of a retainer, as shown in FIG. 9(B). It is observed that the aforementioned hoses also exhibit an excellent pulsation absorbing effect.

Figure 10:
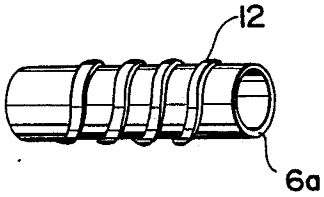
FIG. 10 is a perspective view of a hose in accordance with the seventh embodiment of the invention, particularly illustrating a spirally extending connecting member fixedly attached to the hose.
Figure 11A:
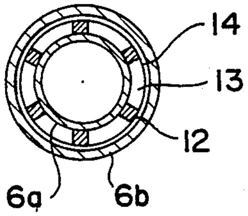
FIGS. 11(A) and 11(B) are cross-sectional views of the hose in FIG. 10, particularly illustrating the function of the hose.
Figure 11B:
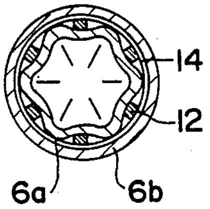

Next, description will be made below as to seventh, eighth and ninth embodiments. As another rexample, of a hose which exhibits pulsation preventive effect there is proposed a hose in accordance with the seventh embodiment as shown in FIGS. 10 and 11. Specifically, the hose has a double-walled structure comprising an inner hose 6*a* and an outer hose 6*b* which surrounds the inner hose 6*a*. The inner hose 6*a* is molded of flexible material so that it is elastically deformed under the influence of pulsation generated by the pump 1. As is best seen in FIG. 10, the hose 6*a* is formed with a spirally extending projection 12 which serves as connecting means between both the inner and outer hoses 6i a and 6i b.

On the other hand, the outer hose 6b has a mesh-shaped thread layer 14 over the inner wall thereof which comes in contact with the outer face of the connecting means 12. Thus, a hollow space 13 is provided between both the inner hose 6*a* and the outer hose 6*b* with the connecting means 12 interposed therebetween. As is apparent from FIG. 11(A), the hollow space 13 constitutes an elastic deformation portion which is elastically deformed under the influence of pulsation generated by the pump 1 and a part of the outer hose 6b corresponding to the connecting means 12 constitutes a deformation inhibitive portion.

As the pump 1 is driven and fuel is delivered therefrom, pulsation generated by the pump 1 is absorbed by the hose 6 without fail. Since the hose 6 includes the inner hose 6a which is elastically deformed under the effect of pulsation transmitted from the pump 1, pulsation is absorbed by the inner hose without fail. Thus, despite the fact that the hose is simple in structure and does not employ a conventional pulsation absorbing device, there is provided a pump passage without substantial occurrence of pulsation such that the pump passage can be designed and constructed in a smaller dimension and light weight.

It should be added that pulsation absorption is not achieved by elastic deformation of the whole inner hose 6*a* but it is achieved by elastic deformation of a part of the inner hose 6a corresponding to the hollow space 13 while geometrical deformation of the inner hose 6*a* is restricted by the outer hose 6*b* which includes the mesh-shaped thread layer 14. Thus, the hose is elastically deformed under the influence of pulsation without substantially affecting the outer configuration of the hose 6. Accordingly, the hose 6 will not interfere with other members when the hose 6 is disposed in a narrow place.

Further, in this embodiment the connecting member 12 serves as a member for forming a deformation restrictive portion for the inner hose *6a* as well as a member for forming the hollow space 13 for allowing the elastic deformation portion to be deformed elastically.

Figure 12A:
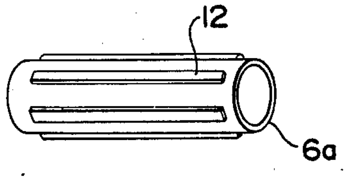
FIGS. 12(A) and 12(B) are perspective views of a hose in accordance with the eigth embodiment of the invention respectively.
Figure 12B:
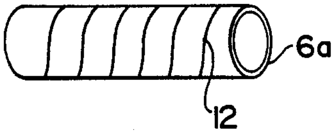
Figure 13:
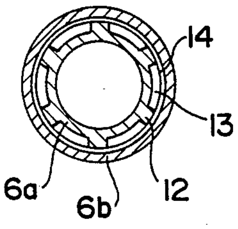
FIG. 13 is a cross-sectional view of a hose in accordance with the ninth embodiment of the invention.

Further, to form an elastic deformation portion and a deformation restrictive portion of the inner hose, the inner hose may include a heavy thickness portion and thin thickness portion wherein the heavy thickness portion serves as deformation restrictive portion and the thin thickness portion serves as elastic deformation portion. In the case where the inner hose is constituted in the form of an elastic deformable flexible hose, the deformation restrictive portion may be directly formed by employing hard material such as metallic material, plastic material or the like in the form of wire, plate or the like as connecting means just like the foregoing embodiment. As means for fitting the connecting means to the inner hose, a plurality of annular connecting members may be fitted to the inner hose in accordance with the eighth embodiment as shown in FIG. 12(B) or a plurality of straight connecting members may be fitted to the inner hose in parallel with one another in the axial direction in accordance with the ninth embodiment as shown in FIG. 12(A) and FIG. 13 in contrast with the foregoing embodiment where the spirally extending connection member is fitted to the inner hose. As a result of the arrangement of the inner hose, a pulsation preventive effect is obtainable as in the foregoing embodiment.

Since the pulsation preventive member of the invention is constructed in the form of hose in the above-described manner, pulsation generated by rotation of a pump can be reliably absorbed in a hose which is simple in structure and is disposed in a pump fluid passage. Accordingly, there is no need for any conventional pulsation absorptive device which has hitherto been required. Further, the pump passage of the present invention can be constructed in a simple manner whereby prevention of pulsation in the pump passage is achieve. Accordingly, the generation of noise due to pulsation can be reduced remarkably, the pump itself can be constructed so as to be dimensionally small and light weight and adverse effects on the fluid supply section can be reduced, resulting in remarkable cost savings.

While the present invention has been described above with respect to several embodiments, it should of course be understood that it should not be limited only to the disclosed embodiments but various changes or modifications may be made in any acceptable manner without departure from the spirit and scope of the invention as defined by the appended claims.

What is claimed is:

1. A pulsation preventive hose for use with a fuel supply pump, both said hose and said fuel supply pump being located in a fuel tank, said hose comprising:

a resilient conduit capable of elastically increasing and decreasing in cross-sectional area under the influence of pulsation of fluid discharged from the fuel supply pump; and a mesh-shaped thread layer incorporated in the resilient conduit, said thread layer comprising at least one rightwardly wound thread and at least one leftwardly wound thread, the threads being roughly wound within said resilient conduit at a mesh angle in the range of 34 to 49 degrees with respect to a longitudinal axis of the resilient conduit and with sufficient spacing between the threads to provide the conduit with relatively stronger and weaker portions in a longitudinal direction thereof while also providing adequate rupture resistance;

whereby said pulsation is substantially prevented under such a condition that elastic deformation of said resilient conduit caused by fluid pulsation is permitted to a certain extent.

2. The pulsation preventive hose of claim 1, wherein said hose has a substantially circular cross-sectional shape.

3. The pulsation preventive hose of claim 1, wherein said hose has a non-circular cross-sectional shape.

4. The pulsation preventive hose of claim 1, wherein said hose has a rectangular or elliptical cross-sectional shape.

5. The pulsation preventive hose of claim 1, wherein said hose has a double-walled structure comprising an inner layer and an outer layer and a plurality of connecting members are interposed between said inner and outer layers so as to build hollow spaces, wherein said inner layer may elastically deform into said hollow spaces.

6. A pulsation absorbing hose for use with a fuel supply pump, both said hose and said fuel supply pump being located in a fuel tank, said hose comprising a resilient conduit capable of elastically increasing and decreasing in cross-sectional area under the influence of pulsation of fluid discharged from the fuel supply pump; and a mesh-shaped thread layer incorporated in the resilient conduit, said thread layer comprising at least one rightwardly wound thread and at least on leftwardly wound thread, the threads being roughly wound within said resilient conduit at a mesh angle in the range of 34 to 49 degrees with respect to a longitudinal axis of the resilient conduit and with sufficient spacing between the threads to provide the conduit with relatively stronger and weaker portions in a longitudinal direction thereof while also providing adequate rupture resistance;

whereby said pulsation is substantially absorbed under such a condition that elastic deformation of said resilient conduit caused by fluid pulsation is permitted to a certain extent.

7. The pulsation absorbing hose of claim 6, wherein said hose has a non-circular cross-sectional shape.

8. The pulsation absorbing hose of claim 6, wherein said hose comprises an outer layer, an inner layer, at least one skeletal connecting member for connecting portions of said inner layer with portions of said outer layer, and hollow spaces located between portions of said inner layer and said outer layer which are not connected to one another by said connecting member, whereby said inner layer is capable of elastic deformation into said hollow spaces.

9. The pulsation absorbing hose of claim 6, wherein said hose has a substantially circular cross-sectional shape.

10. The pulsation absorbing hose of claim 6, wherein said hose has a rectangular or elliptical cross-sectional shape.

* * * * *